(12) United States Patent
Lee (10) Patent No.: US 8,057,073 B2
(45) Date of Patent: *Nov. 15, 2011

(54) LIGHT PIPE AND ILLUMINATING DEVICE HAVING THE SAME

(75) Inventor: Hwan Hee Lee, Chungju-si (KR)

(73) Assignee: LG Electronics Inc., Seoul (KR)

( * ) Notice: Subject to any disclaimer, the term of this patent is extended or adjusted under 35 U.S.C. 154(b) by 254 days.

This patent is subject to a terminal disclaimer.

(21) Appl. No.: 12/267,856

(22) Filed: Nov. 10, 2008

(65) Prior Publication Data

US 2009/0279302 A1    Nov. 12, 2009

(30) Foreign Application Priority Data

May 7, 2008  (KR) .................. 10-2008-0042170

(51) Int. Cl.
*F21V 33/00* (2006.01)
(52) U.S. Cl. ......... 362/340; 362/339; 362/551; 362/582
(58) Field of Classification Search .................. 362/257, 362/310, 326, 327, 340, 551, 555, 558, 339, 362/582

See application file for complete search history.

(56) References Cited

U.S. PATENT DOCUMENTS

| | | | |
|---|---|---|---|
| 4,750,798 A | 6/1988 | Whitehead | |
| 4,996,632 A | 2/1991 | Aikens | 362/32 |
| 5,134,549 A | 7/1992 | Yokoyama | |
| 5,258,896 A * | 11/1993 | Dreyer, Jr. | 362/307 |
| 5,700,077 A * | 12/1997 | Dreyer et al. | 362/551 |
| 5,745,632 A | 4/1998 | Dreyer | |
| 6,123,442 A | 9/2000 | Freier et al. | |
| 6,520,655 B2 | 2/2003 | Ohuchi | |
| 6,612,729 B1 | 9/2003 | Hoffman | |
| 6,706,339 B1 | 3/2004 | Miyatake et al. | |
| 6,796,686 B2 | 9/2004 | Jacob et al. | |
| 7,553,045 B2 * | 6/2009 | Hung | 362/249.01 |
| 7,658,514 B2 | 2/2010 | Lee et al. | |
| 7,748,874 B2 * | 7/2010 | Cho | 362/340 |
| 2002/0141065 A1 | 10/2002 | Cowan et al. | |
| 2004/0066654 A1 | 4/2004 | Jacob et al. | |
| 2004/0218390 A1 | 11/2004 | Holman et al. | 362/245 |
| 2007/0018185 A1 | 1/2007 | Hung | 257/98 |

FOREIGN PATENT DOCUMENTS

| | | |
|---|---|---|
| CN | 1451099 | 10/2003 |
| CN | 1504773 | 6/2004 |
| CN | 2879153 Y | 3/2007 |
| CN | 1971316 | 5/2007 |
| CN | 201003697 | 1/2008 |
| CN | 101122650 | 2/2008 |

(Continued)

OTHER PUBLICATIONS

U.S. Office Action for U.S. Appl. No. 12/268,160 dated Dec. 1, 2009.

(Continued)

*Primary Examiner* — John A Ward
(74) *Attorney, Agent, or Firm* — KED & Associates, LLP (57) ABSTRACT

A light pipe and an illuminating device having the light pipe are provided. The light pipe may include an optical film in a rolled shape to have a hollow conduit and a supporter surrounding a surface of the optical film. The supporter may have at least one of a protrusion and an indentation on a surface of the supporter.

18 Claims, 7 Drawing Sheets

FOREIGN PATENT DOCUMENTS

| | | |
|---|---|---|
| DE | 298 05 667 U1 | 7/1998 |
| EP | 0 225 123 A2 | 6/1987 |
| EP | 1 591 826 A1 | 11/2005 |
| GB | 2 145 760 A | 4/1985 |
| JP | 2001-074919 | 3/2001 |
| KR | 10-2002-0091255 | 12/2002 |
| KR | 10-2008-0014387 | 2/2008 |
| WO | 95/30218 A1 | 11/1995 |
| WO | WO 01/71396 | 9/2001 |
| WO | WO 2007/046337 A1 | 4/2007 |
| WO | WO 2007/064615 A1 | 6/2007 |

OTHER PUBLICATIONS

European Office Action dated Feb. 23, 2010 for related application 08019377.4.
European Office Action dated Feb. 23, 2010 for related application 08019376.6.
Korean Office Action dated Feb. 25, 2010 for related application 95-2010-008452107.
Korean Office Action dated Feb. 25, 2010 for related application 9-5-2010-008360756.
English translation of Chinese Office Action dated Apr. 29, 2010.
English translation of Chinese Office Action dated Jun. 4, 2010 for Chinese Application No. 200810182910.0
European Search Report dated Aug. 5, 2009 for Application No. 08019376.6.
European Search Report dated Aug. 5, 2009 for Application No. 08019377.4.
European Search Report dated Aug. 5, 2009 for Application No. 08019379.0.
English language translation of Chinese Office Action dated Nov. 25, 2010 for Application 200810182910.0.
English language translation of Chinese Office Action dated Dec. 14, 2010 for Application 200810182909.8.
Office Action dated Apr. 5, 2011 from U.S. Appl. No. 12/267,844.
Office Action dated Jun. 28, 2011 for co-pending U.S. Appl. No. 12/267,874.
Chinese Office Action for Application 200810182910.0 dated Jul. 13, 2011.

* cited by examiner

Fig. 1 PRIOR ART

——— LIGHT AIR
------ LIGHT IN OPTICAL FILM

Fig. 2 PRIOR ART

——— LIGHT AIR
------ LIGHT IN OPTICAL FILM

LIGHT PIPE AND ILLUMINATING DEVICE HAVING THE SAME

This application claims priority from Korean Patent Application No. 10-2008-0042170, filed May 7, 2008, the subject matter of which is incorporated herein by reference.

BACKGROUND

1. Field

Embodiments of the present invention may relate to a light pipe and an illuminating device having the light pipe. More particularly, embodiments of the present invention may relate to a light pipe including a supporter having a plurality of protrusions, a plurality of grooves or both formed thereon.

2. Background

Illuminating devices that include a light pipe capable of transmitting light to a remote place with less transmission loss may be used in various places (for example, inside and outside a building). Light pipes may also be referred to as light conduits, light guides or light tubes, and have been used to effectively distribute light across a wide area for various purposes such as for illumination.

Light pipes may be used not only for illuminating certain points but also for illuminating whole areas. Light that transmits through a light pipe may be distributed to outside of the light pipe for illuminating certain points or for maximizing the effect of illumination.

However, illuminating devices using a light pipe may provide different illuminance levels according to their distances from a light source, and thus may not be able to achieve uniform brightness across a longitudinal direction of a light pipe.

BRIEF DESCRIPTION OF THE DRAWINGS

Arrangement and embodiments may be described in detail with reference to the following drawings in which like reference numerals refer to like elements and wherein.

DETAILED DESCRIPTION

Figure 1:
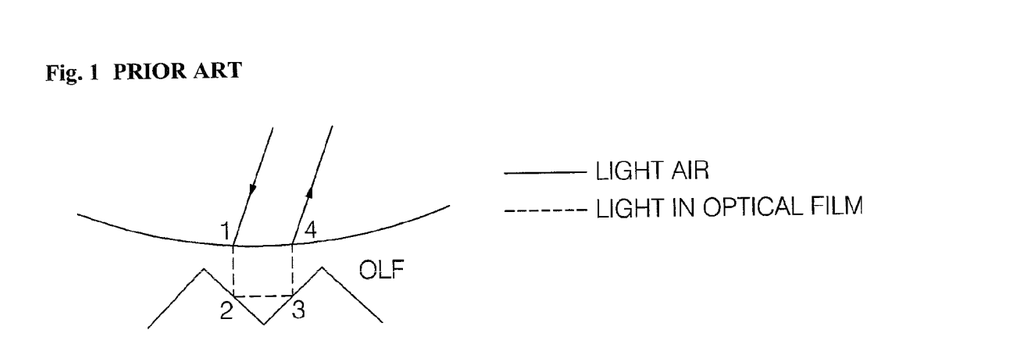
FIG. 1 illustrates a cross-sectional view of an optical film.
Figure 2:
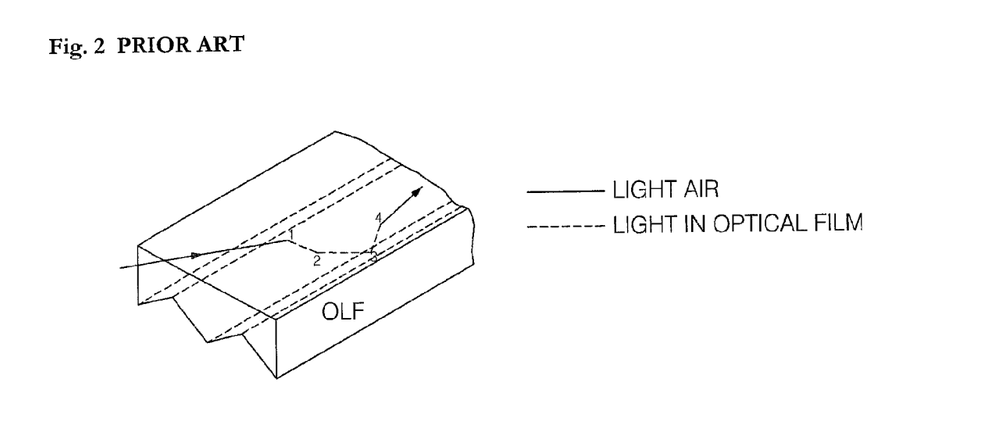
FIG. 2 illustrates a perspective view of the optical film shown in FIG. 1.

FIGS. 1 and 2 illustrate diagrams of an optical film of a light pipe. Other embodiments and configurations are also within the scope of the present invention.

More specifically, FIG. 1 illustrates a cross-sectional view of an optical film that transmits and reflects light in a light pipe. FIG. 2 illustrates a perspective view of the optical film shown in FIG. 1. For ease of discussion, a patterned surface of an optical film is a top surface, and a non-patterned surface of the optical film is a bottom surface.

As shown in FIGS. 1 and 2, light generated by a light source unit (not shown) of a light pipe may be incident upon a non-patterned surface of an optical film (OLF) and may then be refracted at position 1 on the optical film. The refracted light may be totally reflected at positions 2 and 3 on both lateral sides of a prism of the optical film. Thereafter, the totally-reflected light may be refracted at position 4 on the optical film and may be thus incident back into the light pipe.

Light may travel along a longitudinal direction of the light pipe. Since light loss rarely occurs in air inside the light pipe, the light pipe can effectively transmit light even to a remote area without any loss (or with minimal loss).

Figure 3:
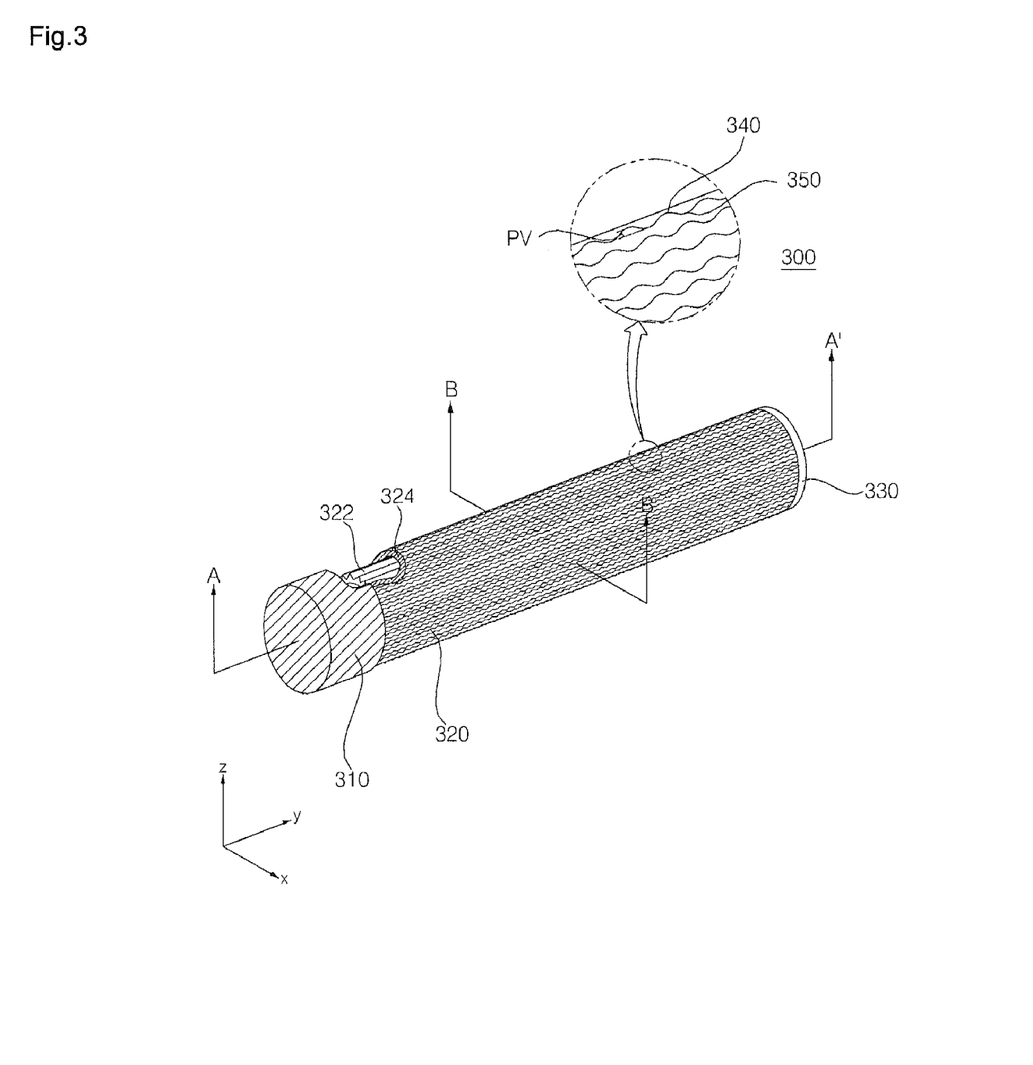
FIG. 3 illustrates a perspective view of an illuminating device according to an example embodiment of the present invention.
Figure 4:
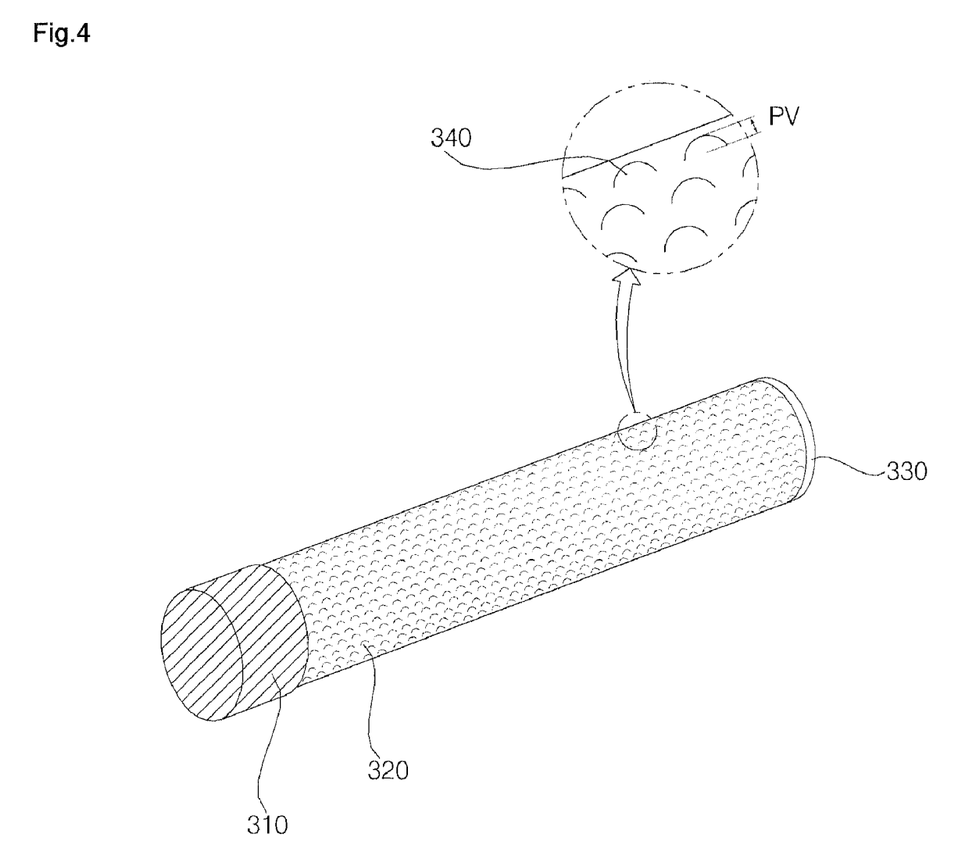
FIG. 4 illustrates a perspective view of an illuminating device according to another example embodiment of the present invention.

FIGS. 3 and 4 illustrate diagrams of illuminating devices according to example embodiments of the present invention. Other embodiments and configurations are also within the scope of the present invention.

FIG. 3 illustrates a perspective view of an illuminating device 300. As shown in FIG. 3, the illuminating device 300 may include a light source unit 310 (having a light source), a light pipe 320 and a reflecting cap 330.

The light source unit 310 may be supplied with power and thus generate light. The light generated by the light source unit 310 may be provided to the light pipe 320, which is optically connected to the light source unit 310. The optical film 322 disposed inside a supporter 324 may have a patterned surface on which a plurality of prisms are formed. The patterned surface may include a plurality of peaks and a plurality of valleys formed from the plurality of valleys. The optical film 322 may be rolled up into a cylinder-shape having a substantially same length as the supporter 324 and having a hollow conduit (or area) extending along a longitudinal array (or direction) of the prisms (i.e., a Y direction). The optical film 322 may therefore be provided in a rolled shape (either fully rolled or partially rolled). The light generated by the light source unit 310 may travel along a longitudinal direction of the light pipe 320 by being totally reflected by the optical film 322.

Even though most of the light generated by the light source unit 310 travels along the longitudinal direction of the light pipe 320 by being totally reflected by the optical film 322, light incident upon the optical film 322 at an angle less than a critical angle of the optical film 322 may be emitted toward outside the light pipe 320 rather than being totally reflected by the optical film 322, according to Snell's law.

As a result, an amount of light may be less in a portion of the light pipe 320 distant from the light source unit 310 than in a portion of the light pipe 320 less distant from the light source unit 310. Thus, luminance of the light pipe 320 may become lower as it becomes more distant from the light source unit 310.

At least one of an outer surface and an inner surface of the supporter 324 may be surface-treated. Scattered reflection and scattering of the light generated by the light source unit 310 may be induced and thus light may be uniformly emitted across the whole tight pipe 320.

At least one of the outer surface and the inner surface of the supporter 324 may be surface-treated through injection, extrusion, thermal curing, ultraviolet (UV) curing, molding or roll processing so that a plurality of protrusions 340 and/or a plurality of indentations 350 can be formed on the supporter 324. For example, at least one of the outer surface and the inner surface of the supporter 324 may be surface-treated by pressing a roll or a plate engraved with a plurality of protrusions and/or a plurality of indentations down on a surface of the supporter 324 so as to transfer the protrusions and/or the indentations of the roll or plate to the supporter 324.

Alternatively, at least one of the outer surface and the inner surface of the supporter 324 may be surface-treated by injecting resin into a panel-type mold engraved with a plurality of protrusions and/or a plurality of indentations and curing the resin. The surface treatment of the supporter 324 may be performed in various manners other than those set forth herein. A density of the protrusions 340 and/or the indentations 350 may increase according to distance from the light source unit 310.

FIG. 4 illustrates a perspective view of an illuminating device according to an example embodiment of the present invention. Other embodiments and configurations are also within the scope of the present invention.

As shown in FIG. 4, only the plurality of protrusions 340 may be formed on the surface of the supporter 324 of the light pipe 320. Alternatively, only a plurality of indentations may be formed on the surface of the supporter 324 of the light pipe 320.

A supporter having the plurality of protrusions 340 and/or the plurality of indentations 350 may have a predetermined surface roughness. Surface roughness is a measure of surface irregularities. The maximum surface roughness of the supporter 324, which means a peak-to-valley (PV) surface roughness of the supporter 324, may indicate a maximum of differences between heights of the protrusions 340 (or peaks) and depths of the indentations 350 (or valleys). Stated differently, surface roughness may be based on a height distance of one protrusion (or peak) on the surface of the supporter and a depth distance of one indentation (or valley) on the surface of the supporter.

Surface roughness will hereafter be described with reference to FIG. 5.

Figure 5:
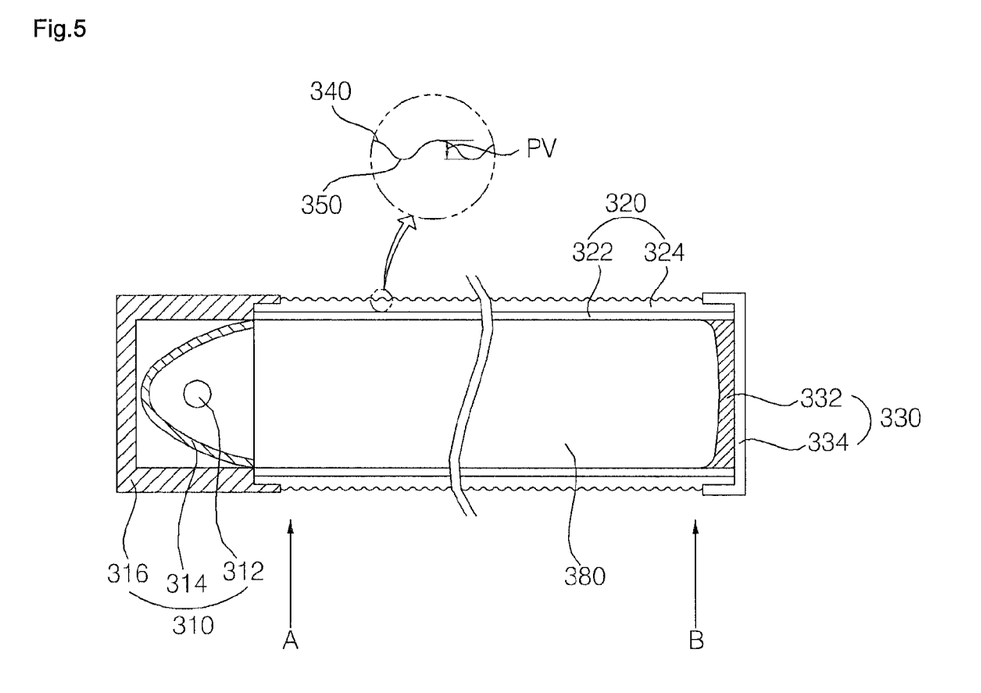
FIG. 5 illustrates a cross-sectional view taken along line A-A' of FIG. 3.

FIG. 5 illustrates a cross-sectional view taken along line A-A' of FIG. 3. As shown in FIG. 5, the light source unit 310 may include a light source 312 that generates light, a reflective mirror 314 disposed at a rear of the light source 312, and a housing 316 that holds the light source 312 and the reflective mirror 314.

The light source 312 may be supplied with power by an external power source, and thus may generate light. Examples of the light source 312 may include a halogen lamp, a light-emitting diode (LED), a metal halide lamp and a plasma lighting source.

The reflective mirror 314 may be disposed at a rear of the light source 312. The reflective mirror 314 may reflect light generated by the light source 312 and thus may make the light generated by the light 312 incident into the light pipe 320. The structure of the reflective mirror 314 may be altered according to length of the light pipe 320. The reflective mirror 314 may be formed as an aspherical reflective mirror. The reflective mirror 314 may be formed of a material (such as a metal or a plastic material) that can be easily processed. The surface of the reflective mirror 314 may be coated with a film that is formed of a highly-reflective metal material such as aluminum or silver.

The housing 316 may have an empty space therein and may thus hold the light source 312 and the reflective mirror 314 therein. The housing 316 may be formed of a material (such as a metal) that is highly rigid, heat-resistant, and can be easily processed.

Light generated by the light source unit 310 may be incident into the light pipe 320. The light pipe 320 may not only transmit the light generated by the light source unit 310 in a longitudinal direction of the light pipe 320 but may also distribute the light generated by the light source unit 310 to outside the illuminating device 300.

The light pipe 320 may include the optical film 322 and the supporter 324.

The optical film 322 may have a patterned surface on which a plurality of prisms are formed. For example, the surface may be patterned to have a plurality of peaks and a plurality of valleys formed from the plurality of peaks. The optical film 322 may have substantially a same length as the supporter 324 and may be rolled up into a cylinder-shape having a hollow conduit (or area) 380. The optical film 322 may be provided in a rolled shape (either fully rolled or partially rolled). The optical film 322 may be formed of a thermoplastic material with high optical transmittance and well-balanced mechanical, heat-resistant and electrical properties. For example, the optical film 322 may be formed of polymethyl metacrylate (PMMA), polyethylene terephthalate (PET) or polycarbonate (PC).

The optical film 322 may have a patterned surface on which a plurality of prisms are formed. The prisms of the optical film 322 may be formed as inequilateral triangles, isosceles triangles, trapezoids or regular triangles, for example. More specifically, the prisms of the optical film 322 may be formed as isosceles triangles having an angle of approximately 90 degrees.

The supporter 324 may be provided outside of the optical film 322. The supporter 324 may surround the optical film 322.

The supporter 324 may be formed through coating, extrusion, injection, molding or roll processing. For example, the supporter 324 may be formed by forming a film through coating, extrusion, molding, injection or roll processing and then rolling up (or partially rolling up) the film into a cylinder-shape. Alternatively, the supporter 324 may be formed by forming a cylinder-shape through extrusion. The supporter 324 may be formed using various methods, other than those set forth herein.

The supporter 324 may be formed of a thermoplastic resin material with high optical transmittance and excellent mechanical, heat-resistant and electrical properties. For example, the supporter 324 may be formed of polymethyl metacrylate (PMMA), polycarbonate or polyethylene terephthalate (PET). The supporter 324 may be formed of PMMA because PMMA is highly rigid and is thus rarely broken and deformed.

As shown in FIG. 5, at least one of the outer surface and the inner surface of the supporter 324 may be surface-treated so that the plurality of protrusions 340, the plurality of indentations 350 or both can be formed on the supporter 324.

Due to the protrusions 340 and/or the indentations 350, light may uniformly emit from the light pipe 320 by inducing scattered reflection and scattering of light generated by the light source 312 of the light source unit 310.

Density of the protrusions 340 and/or the indentations 350 may increase according to distance from the light source unit 310. Light scattering may increase according to distance from the light source unit 310. Therefore, light may uniformly emit from the whole light pipe 320.

The protrusions 340 and/or the indentations 350 may be formed through injection, extrusion, thermal curing, UV curing, molding or roll processing. The protrusions 340 and/or the indentations 350 may be formed by performing surface treatment on the supporter 324. Once the supporter 324 is surface-treated, the supporter 324 may have a predetermined surface roughness.

Surface roughness is a measure of surface irregularities. The maximum surface roughness of the supporter 324 (i.e., the peak-valley (P-V) surface roughness of the supporter 324) may indicate a maximum of differences between heights of the protrusions (or peaks) and depths of the indentations 350 (or valleys). Stated differently, surface roughness may be based on a height distance of one protrusion (or peak) on the surface of the supporter and a depth distance of one indentation (or valley) on the surface of the supporter.

Table 1 shows a relationship between surface roughness of the supporter 324 and surface illuminance and optical transmittance of the light pipe 320. In the following Table 1, x and o and ⊚ represent bad, good and excellent states.

TABLE 1

| P-V Surface Roughness | Surface Illuminance of A Portion (cd/m$^2$) | Surface Illuminance of B Portion (cd/m$^2$) | Optical Transmittance |
|---|---|---|---|
| 2 μm | 11000 | 5000 | ⊚ |
| 3 μm | 6000 | 5450 | ○ |
| 4 μm | 5900 | 5450 | ○ |
| 10 μm | 5800 | 5470 | ○ |
| 20 μm | 5700 | 5490 | ○ |
| 27 μm | 5620 | 5500 | ○ |
| 28 μm | 5600 | 5500 | ○ |
| 30 μm | 5500 | 5500 | ○ |
| 31 μm | 5400 | 5400 | X |

Referring to Table 1, when the supporter 324 has a surface roughness of less than 3 μm, the scattered reflection performance of the supporter 324 may deteriorate, and thus a difference between the surface illuminance (i.e., the surface illuminance at portion A) at an end of the light pipe 320 near the light source unit 310 and the surface illuminance (i.e., the surface illuminance at portion B) at the other end of the light pipe 320 distant from the light source unit 310 may increase. Therefore, light may uniformly emit from the whole light pipe 320.

On the other hand, when the supporter 324 has a surface roughness of more than 30 μm, transmission of light may deteriorate in both portions A and B, and thus the light pipe 320 may not effectively emit light.

The supporter 324 may have a surface roughness of approximately 3 μm to approximately 30 μm. In this case, the light pipe 320 may effectively transmit light from one end of the light pipe 320 to the other end of the light pipe 320, and the optical transmittance of the light pipe 320 may increase.

When the supporter 324 has a surface roughness of approximately 3 μm to approximately 30 μm, a difference between a surface illuminance at portion A (i.e., an end of the light pipe 320 near the light source unit 310) of the light pipe 320. Additionally, a surface illuminance at portion B (i.e., the other end of the light pipe 320 distant from the light source unit 310) of the light pipe 320 may be within a range of approximately 0 to 450 cd/m$^2$, and a ratio of the surface illuminance at portion A to the illuminance at portion B may be within the range of approximately 1:09 to 1:1.

One of the outer surface or the inner surface of the supporter 324 may be surface-treated. Alternatively, the outer surface and the inner surface of the supporter 324 may both be surface-treated. The protrusions 340, the indentations 350 or both may be formed as one integral body with the supporter 324 by surface-treating the supporter 324.

As shown FIG. 5, the reflecting cap 330 may include a cap portion 334 and a reflector 332 that is disposed in the cap portion 334. The reflector 332 may be disposed at an end of the light pipe 320 and the reflector 322 may reflect light transmitted through the light pipe 320. The surface of the reflector 332 may be coated with a highly-reflective metal material such as aluminum or silver.

Figure 6:
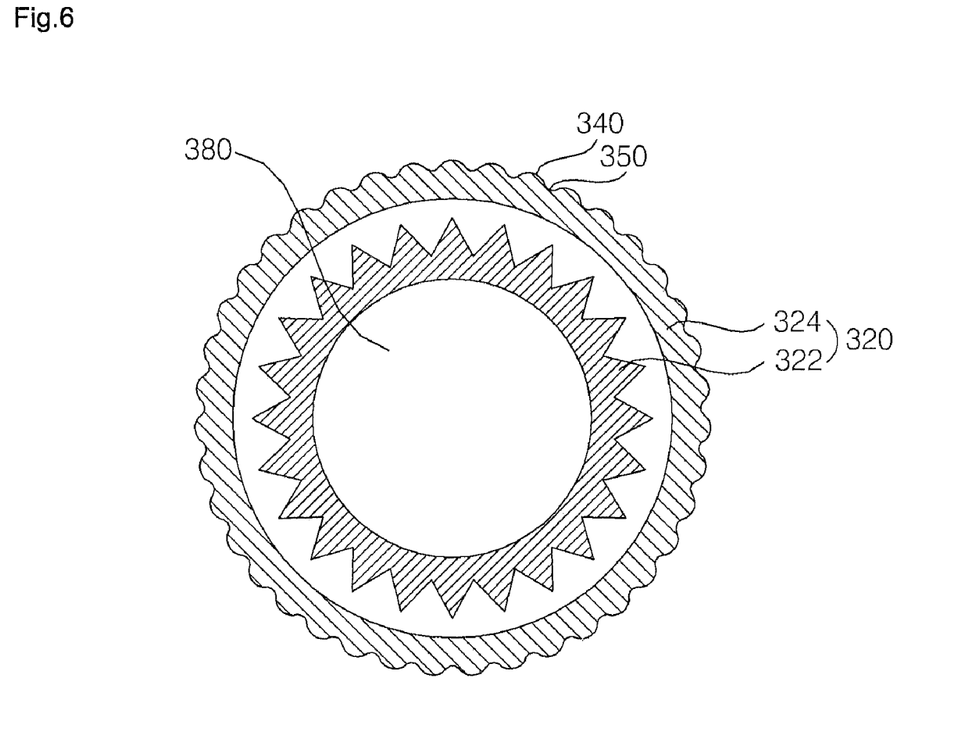
FIG. 6 illustrates a cross-sectional view taken along line B-B' of FIG. 3.

FIG. 6 illustrates a cross-sectional view taken along line B-B' of FIG. 3. The optical film 322 may be rolled up into a cylinder-shape having the hollow conduit 380 as shown in FIG. 6. An outer surface of the optical film 322 may be patterned, as shown in FIG. 6. Alternatively, an inner surface of the optical film 322 may be patterned.

One surface of the optical film 322 may be patterned by forming a linear array of prisms, whereas the other surface of the optical film 322 may be substantially smooth or flat. More specifically, a plurality of prisms may be formed on one surface of the optical film 322. The prisms of the optical film 322 may be formed as inequilateral triangles, isosceles triangles, trapezoids or regular triangles, for example. The prisms of the optical film 322 may be formed as isosceles triangles having an angle of approximately 90 degrees.

The supporter 324 may be provided outside of the optical film 322. The supporter 324 may surround the optical film 322 and may thus protect the optical film 322 against external shock, for example.

One of the outer surface and the inner surface of the supporter 324 may be surface-treated through injection, extrusion, thermal curing, UV curing, molding, or roll processing so that the protrusions 340, the indentations 350 or both can be formed on the supporter 324. Due to the protrusions 340 and/or the indentations 350, light may be uniformly emitted from the whole light pipe 320 by inducing scattered reflection of light generated by the light source 312 of the light source unit 310.

Figure 7:
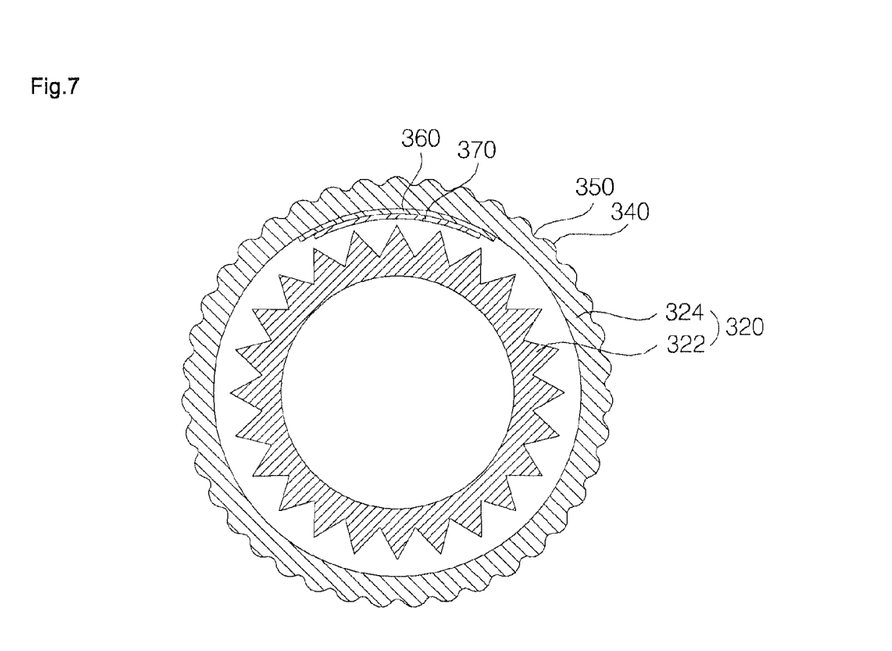
FIG. 7 illustrates a cross-sectional view taken along line B-B' of FIG. 3 of an illuminating device according to another example embodiment of the present invention.
Figure 8:
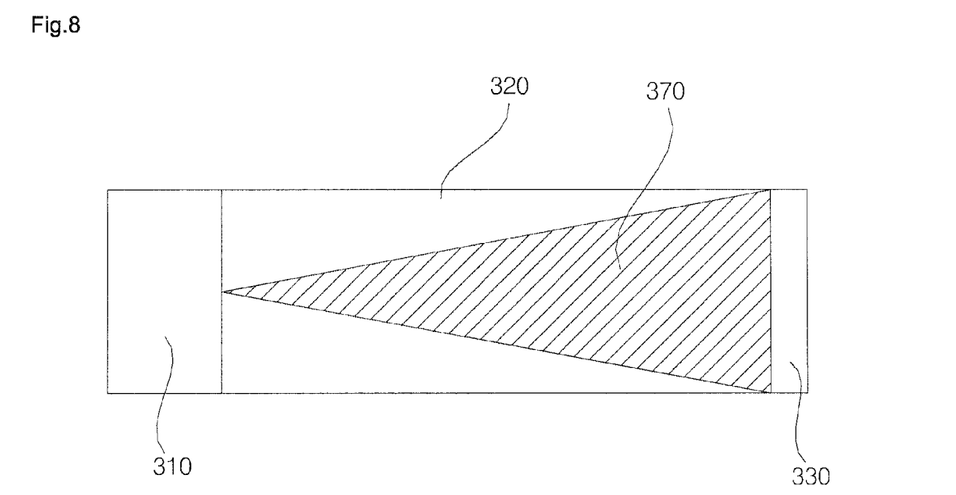
FIG. 8 illustrates a plan view of the illuminating device shown in FIG. 3.

FIG. 7 illustrates a cross-sectional view taken along line B-B' of FIG. 3. FIG. 8 illustrates a plan view of the illuminating device 300 shown in FIG. 3. For ease of illustration, the light pipe 320 is shown in FIG. 8 as having an even surface.

As shown in FIG. 7, the illuminating device 300 may also include at least one of a reflector 360 and an extractor 370 that are each disposed between the optical film 322 and the supporter 324.

The reflector 360 may reflect light so that light can be emitted from the light pipe 320 in only a predetermined direction. The extractor 370 may change an angle of light totally-reflected in the light pipe 320 so that the light can be emitted from the light pipe 320 rather than being totally reflected any longer.

As shown in FIG. 8, a width of the extractor 370 may become larger as it becomes distant from the light source unit 310. In this case, an amount of light emitted from a portion of the light pipe 320 distant from the light source unit 310 may be greater than an amount of light emitted from a portion of the light pipe 320 less distant from the light source unit 310. Therefore, the light pipe 320 may uniformly emit light.

Figure 9:
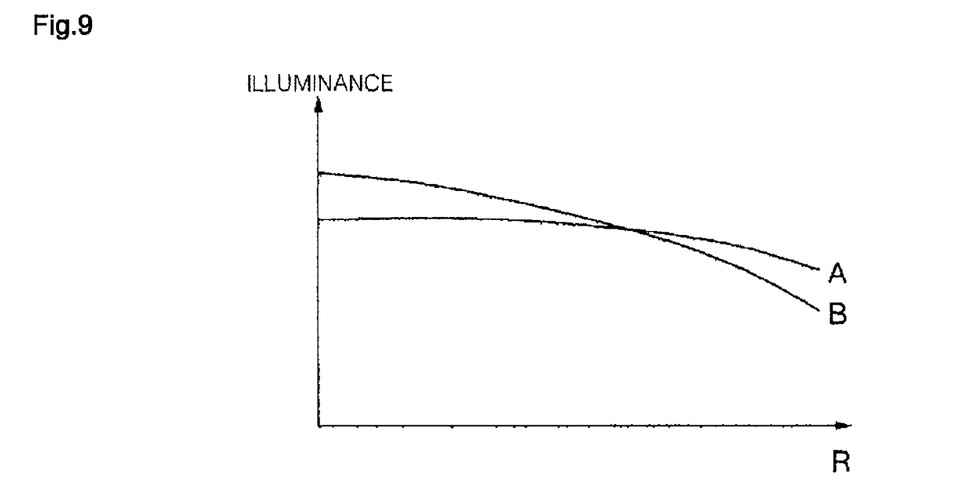
FIG. 9 illustrates a diagram for comparing illuminance of a light pipe including a surface-treated supporter and illuminance of a light pipe including a non-surface-treated supporter.

FIG. 9 illustrates a diagram for comparing illuminance of a light pipe A including a surface-treated supporter and illuminance of a light pipe B including a non-surface-treated supporter. As shown in FIG. 9, the light pipe A may have a relatively low surface illuminance near a light source unit, but surface illuminance of the light pipe A may not vary much according to distance from the light source unit. On the other hand, the light pipe B may have a relatively high surface illuminance near a light source unit, but the surface illuminance of the light pipe B may gradually decrease according to distance from the light source unit.

Therefore, light may be uniformly emitted from a whole light pipe by forming a plurality of protrusions and/or a plurality of indentations on either an outer surface or an inner surface of the supporter 324 through injection, extrusion, thermal curing, or UV curing.

As shown in FIGS. 7 and 8, the supporter 324 may have a surface roughness of approximately 3-30 μm. If the supporter 324 has a surface roughness of less than approximately 3 μm, then scattered reflection performance of the supporter 324 may deteriorate, and thus the light pipe 320 may not uniformly emit light. On the other hand, if the supporter 324 has a surface roughness of more than approximately 30 μm, optical transmittance of the supporter 324 may deteriorate.

Figure 10:
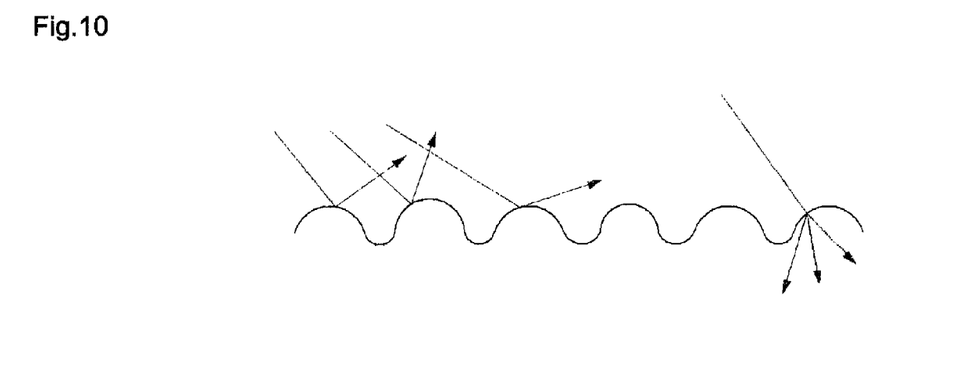
FIG. 10 illustrates a diagram for explaining optical properties of a surface-treated light pipe.

FIG. 10 illustrates a diagram for explaining optical properties of a surface-treated supporter. A surface-treated supporter may cause scattered reflection and scattering of light. When light strikes a rough or granular surface, the light may bounce off in all directions by being reflected from the surface. This phenomenon may be referred to as scattered reflection. When light collides with particles, the light may bounce off in all directions. This phenomenon may be referred to as scattering.

If a plurality of protrusions and/or a plurality of indentations are formed on a supporter of a light pipe, trajectory of light incident upon the light pipe may vary. The incident light may be totally reflected and may thus deviate from its original trajectory. In addition, the incident light may be scattered and may thus be emitted toward outside of the light pipe.

The protrusions and/or the indentations may be formed densely in a region near a reflecting cap at which only a small amount of light arrives rather than in a region near a light source unit at which a relatively large amount of light arrives. In this case, light may uniformly emit from a whole light pipe. The protrusions and/or the indentations may be formed on either an outer surface or an inner surface of a supporter of a light pipe. Alternatively, the protrusions and/or the indentations may be formed on both the outer surface and the inner surface of a supporter of a light pipe.

Embodiments of the present invention may provide a light pipe that includes a surface-treated supporter and can thus uniformly emit light across a longitudinal direction of the light pipe.

A light pipe may be provided that includes an optical film that is rolled (or in a rolled shape) to have a hollow conduit and a supporter surrounding the optical film. The supporter may have at least one of a protrusion and an indentation. The surface roughness of the supporter may range from approximately 3 μm to approximately 30 μm.

An illuminating device may be provided that includes a light source, a light pipe transmitting and distributing a light from the light source, and a supporter surrounding the optical film. The supporter may have at least one of a protrusion and an indentation. The optical film may be rolled (or in a rolled shape) to have a hollow conduit. The surface roughness of the supporter may range from approximately 3 μm to approximately 30 μm.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light pipe comprising:
   an optical film in a rolled shape and having a hollow conduit; and
   a supporter to surround a surface of the optical film,
   wherein the supporter includes at least one of a protrusion and an indentation on a surface of the supporter,
   wherein a surface roughness of the surface of the supporter ranges from approximately 3 μm to approximately 30 μm, and
   wherein the optical film includes a first surface having a linear array of prisms and a second surface opposite the first surface.

2. The light pipe of claim 1, wherein the surface roughness is based on a height distance of at least one protrusion on the surface of the supporter.

3. The light pipe of claim 2, wherein the surface roughness is further based on a depth distance of one indentation on the surface of the supporter.

4. The light pipe of claim 1, wherein at least one of the protrusion and the indentation is formed as one integral body with the supporter.

5. The light pipe of claim 1, wherein the surface of the supporter is at least one of an inner surface and an outer surface of the supporter.

6. The light pipe of claim 1, wherein at least one of the protrusion and the indentation is formed by at least one of an injection molding method, an extruding method, a thermo curing method, a UV curing method, a molding method and a roll method.

7. The light pipe of claim 1, wherein the linear array of prisms face the supporter.

8. The light pipe of claim 1, further comprising:
   at least one of a reflector and an extractor on the supporter.

9. An illuminating device comprising:
   a light source; and
   a light pipe to distribute a light from the light source, the light pipe including:
      an optical film in a rolled shape and having a hollow conduit, and
      a supporter to surround the optical film,
   wherein the supporter has at least one of a protrusion and an indentation on a surface of the supporter,
   wherein a surface roughness of the surface of the supporter ranges from approximately 3 μm to approximately 30 μm, and
   wherein the optical film includes a first surface having a linear array of prisms and a second surface opposite the first surface.

10. The illuminating device of claim 9, wherein at least one of the protrusion and the indentation is formed as one integral body with the supporter.

11. The illuminating device of claim 9, wherein the surface of the supporter is at least one of an inner surface and an outer surface of the supporter.

12. The illuminating device of claim 9, further comprising a reflecting cap at one end of the light pipe.

13. The illuminating device of claim 12, wherein a density of at least one of the protrusion and the indentation is larger at an area near the reflecting cap as compared to a density of at least one of the protrusion and the indentation at an area near the light source.

14. The illuminating device of claim 12, further comprising:
at least one of a reflector and an extractor on the supporter.

15. The illuminating device of claim 14, wherein a size of the extractor is larger at an area of the light pipe near the reflecting cap as compared to a size of the extractor at an area of the light pipe near the light source.

16. The illuminating device of claim 9, wherein the linear array of prisms face the supporter.

17. The illuminating device of claim 9, wherein a difference between a surface illuminance at one end of the light pipe near the light source and a surface illuminance at the other end of the light pipe distant from the light source ranges from approximately 0 $cd/m^2$ to approximately 450 $cd/m^2$.

18. The illuminating device of claim 9, wherein a ratio of a surface illuminance at one end of the light pipe near the light source to a surface illuminance at the other end of the light pipe distant from the light source ranges from 1:0.9 to 1:1.

* * * * *